Sept. 28, 1965    J. D. NESBITT    3,208,935
WATER RECARBONATING METHOD AND APPARATUS
Filed Jan. 8, 1962
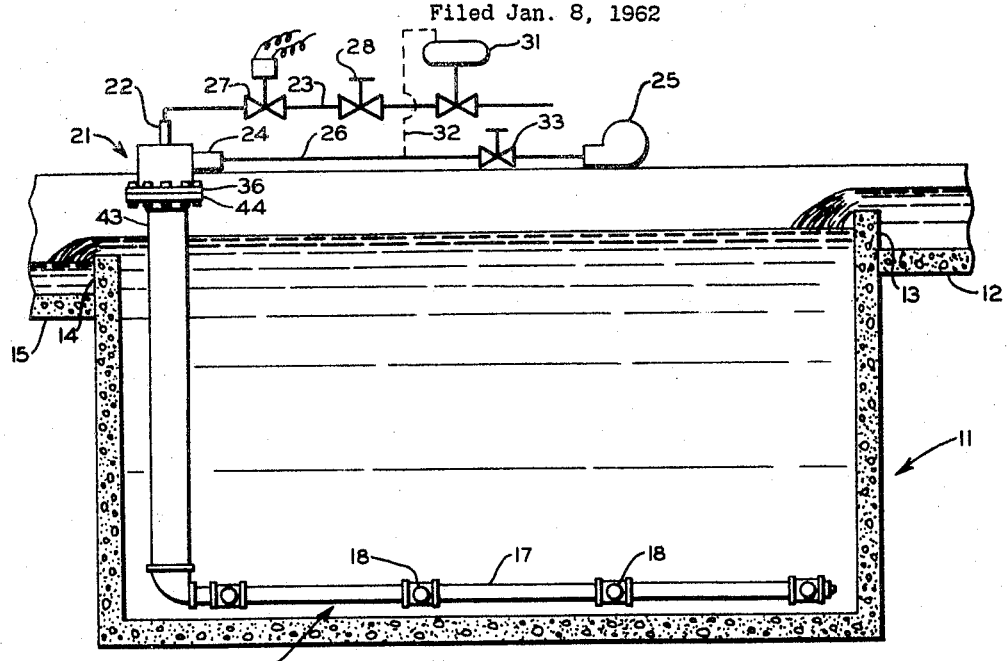
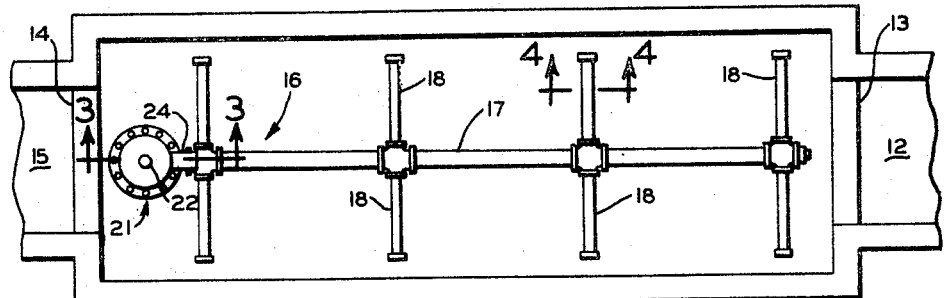
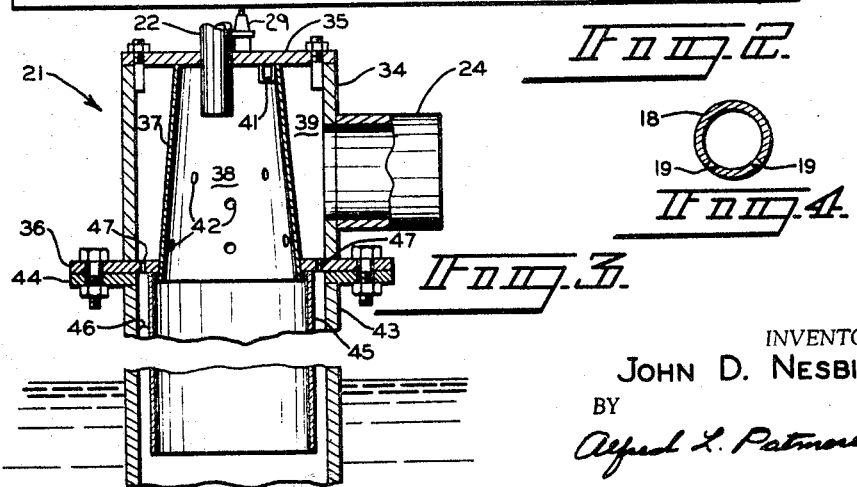
INVENTOR.
JOHN D. NESBITT
BY
ATTORNEY

United States Patent Office 3,208,935
Patented Sept. 28, 1965

3,208,935
WATER RECARBONATING METHOD
AND APPARATUS
John D. Nesbitt, Toledo, Ohio, assignor to Midland-Ross Corporation, Toledo, Ohio, a corporation of Ohio
Filed Jan. 8, 1962, Ser. No. 164,814
2 Claims. (Cl. 210—59)

This invention relates to the art of water treating and is particularly concerned with a novel method of, and apparatus for, the recarbonation of lime-softened water.

As is explained more fully in Hoover's Water Treatment and Supply, 8th ed. by Merrill L. Riehl, published by National Lime Association (1957), water is commonly softened by the addition thereto of lime (CaO) and soda ash ($Na_2CO_3$) in a process commonly called the lime-soda process. Water softened in this manner is considered unstable because it is supersaturated with calcium carbonate which tends to form an undesirable deposit within the distribution system, particularly if the water is heated. This characteristic instability of lime-softened water may be overcome by recarbonating the water, that is, by adding carbon dioxide to the water to react with the carbonate to form the more soluble bicarbonate according to the formula:

$$CaCO_3 + H_2O + CO_2 \rightleftarrows Ca(HCO_3)_2$$

An incidental advantage of this process is that the taste of the softened water is rendered more palatable.

Heretofore, it has been customary to recarbonate lime-softened water by passing cooled $CO_2$-containing combustion gases from an inert atmosphere generator, similar to that described in United States Patent 2,714,552 to Martin, through a submerged ported sparger. This technique involves a number of inherent disadvantageous features which are eliminated by the present invention. One of the foremost disadvantages of the prior art technique is in the initial expense of the equipment. Conventional inert atmosphere generators require a large refractory lined combustion chamber, which frequently is water-jacketed to avoid overheating, plus atmosphere cooling means such as an indirect shell and tube type cooler. Secondly, it is customary in water treating processes to use untreated water as the cooling medium in the cooling tower and in water-jacketed parts. Such untreated water frequently contains considerable quantities of dissolved minerals which tend to precipitate upon heating. Also, the combustion equipment available for such generators can normally be turned down only a limited extent, e.g. 5:1, and then only by reducing the flow of both fuel and air consequently reducing the mass flowing through the submerged sparger into the water being treated, thereby leading to uneven distribution of flow from the sparger into the water. In addition, the combustion equipment available for such generators tends to go off ratio toward the rich side upon turned-down firing rates which leads to incomplete oxidation of the carbon constituent of the fuel with a resultant decrease in the relative quantity of $CO_2$ in the combustion products to the quantity of fuel combusted and the formation of the toxic and hazardous constituents of CO and $H_2$.

It is, therefore, the object of this invention to provide improved water recarbonating method and apparatus. It is a further object of this invention to provide water recarbonating method and apparatus for bubbling $CO_2$-containing combustion products upwardly through water being treated in a basin at a relatively constant mass flow rate with a widely variable $CO_2$ content. It is a further object of this invention to provide combustion apparatus for combusting a carbon-containing fuel to produce $CO_2$-containing combustion products for water recarbonation with a widely variable $CO_2$ content while maintaining the relative quantity of $CO_2$ in the combustion gases formed from the combustion of a given quantity of fuel at a maximum value. It is a further object of the invention to provide apparatus for recarbonating water without the water cooled members characteristic of the inert atmosphere generators utilized in the prior art.

For a further consideration of what is considered to be novel and inventive attention is directed to the following portion of the specification, the drawing, and the appended claims.

In the claims:
FIG. 1 is an elevational view, in section, of a water recarbonating basin incorporating the present invention;
FIG. 2 is a plan view of the apparatus of FIG. 1;
FIG. 3 is a fragmentary section view taken on line 3—3 of FIG. 2; and
FIG. 4 is a fragmentary view taken on line 4—4 of FIG. 2.

Referring more particularly to FIG. 1, numeral 11 represents a water treating basin which may be of conventional construction. Water to be recarbonated is continually added to basin 11 by means of inlet channel 12 over weir 13. Water that has been recarbonated flows from basin 11 over weir 14 into outlet channel 15. The use of outlet weir 14 in this manner serves to maintain a relatively constant water level in basin 11.

The water in basin 11 is recarbonated by bubbling $CO_2$-containing gases therethrough. This, in turn is accomplished by passing such gases into the water in basin 11 by means of a submerged sparger, indicated generally at 16. Sparger 16 comprises an elongate distribution pipe 17 and a plurality of branch pipes 18 extending therefrom. Each of branch pipes 18 is provided with a plurality of ports 19, as is shown more fully in FIG. 4, preferably disposed in the bottom portion thereof, for the release of $CO_2$-containing gases into the water.

The $CO_2$-containing gases which are passed into the water in basin 11 through sparger 16 comprise the products of the combustible reaction of a carbon-bearing fuel (e.g. natural gas whose principle constituent is $CH_4$) and at least a stoichiometric quantity of air. This combustible reaction is initiated and stabilized by means of a combustor, shown generally at 21, located exteriorly of the water in basin 11. A carbon-bearing fuel is delivered to fuel inlet connection 22 of combustor 21 from a source, not shown, by means of conduit 23. Air is delivered to air inlet connection 24 of combustor 21 from a blower 25 by means of conduit 26.

The rate at which fuel is delivered to combustor 21 is modulated between predetermined maximum and minimum values by means of modulating valve 27 which can be operated either manually or automatically in response to some signal indicative of the recarbonation demand (e.g., the rate at which water to be recarbonated is being added to basin 11 from channel 12 or the rate at which recarbonated water is withdrawn from basin 11 by channel 15). Fuel line 23 also comprises manual shutoff valve 28. A conventional pressure regulating device 31 is provided in fuel line 23 upstream of valve 28. Regulator 31 is backloaded to air line 26 by means of loading line 32 (shown dotted) thereby serving to equalize the fuel pressure in fuel line 23 upstream of shutoff valve 28 to the pressure in air line 26 downstream of shutoff valve 33.

Combustor apparatus 21, which is similar to the apparatus described in my co-pending application Serial No. 102,316 filed on April 11, 1961, is formed by annular wall means 34, backplate 35, and annular outlet flange 36. Disposed within the volume defined by wall means 34 are ported wall means 37 which defines a combustion chamber 38, preferaby of frusto-conical configuration. Ported wall means 37 also defines an annular chamber 39 with wall means 34. Chamber 39 is in fluid communication with air inlet connection 24 and serves as an air housing.

All of the fuel to be combusted is delivered generally axially to combustion chamber 38 by means of fuel inlet connection 22, which terminates at a point somewhat remote from backplate 35. A small portion of the combustion air (approximately 3-7%) is admitted tangentially to combustion chamber 38 by means of inlet pipe 41 which extends from air housing 39 into combustion chamber 38 substantially perpendicularly to the axis thereof and generally adjacent to backplate 35. The tight spinning effect imparted to the air admitted through inlet 41 by virtue of its tangential flow creates a vortex suction effect at the outlet of fuel inlet pipe 22. Because of this vortex suction the outer portion of the fuel stream is drawn backward along the exterior of fuel inlet pipe 22 toward backplate 35 where it mixes with air added through inlet 41 to form a highly combustible mixture adjacent backplate 39. This mixture when once ignited, as by means of spark plug 29, forms a ring of flame adjacent backplate 35 and extending toward annular plate 36. This flame serves to stabilize the combustible reaction of the the remaining portion of the air stream, which enters combustion chamber 39 by means of ports 42 in wall means 37 and the balance of the fuel stream admitted through nozzle 22. Ports 42 are sized and spaced in such a manner as to sustain the combustion of the remaining portion of the fuel stream in combustion chamber 38 without flame quenching.

The $CO_2$-containing combustion products from combustion chamber 38 (plus any fuel and air still in the process of reacting combustibly) are delivered therefrom into the inlet of a downcomer pipe 43 which is attached to combustor 21 as by means of a flange 44 bolted to flange portion 36. The outlet of downcomer 43 is in fluid communication with distribution pipe 17 of sparger 16 thereby allowing the $CO_2$-containing combustion products from combustor to escape through branch pipes 18 into the water to be recarbonated.

To provide for maximum life of downcomer pipe it is important to safeguard the portion exterior of the water being recarbonated from the deleterious effects of the high temperature of the $CO_2$-containing combustion products. This may be accomplished by means of an annular shield 45 which extends from combustor 21 into downcomer pipe 43 for a distance beneath the surface of the water in basin 11. Annular shield 45 has an outer diameter somewhat less than the inner diameter of the surrounding portion of downcomer pipe 43 and is disposed generally axially thereof, thereby forming an annular space 46 which serves to insulate the exposed portion of downcomer pipe 43. Additionally, ports 47 may be provided in annular plate 36 to admit some air from chamber 39 to annular space 46 for cooling purposes.

In the operation of the above-described water recarbonating apparatus it is important to obtain the maximum possible quantity of $CO_2$ for a given fuel consumption. Accordingly, blower 25 must be sized to provide at least a quantity of air equal to the quantity of air required for stoichiometric combustion of the fuel stream when flowing at the predetermined maximum rate. To maintain uniform distribution, it is also important that the flow of $CO_2$-containing combustion gases from sparger 16 into the water in basin 11 be maintained at a rate as nearly constant notwithstanding the wide deviations in $CO_2$ content obtained by modulating valve 27 between the predetermined maximum and minimum settings. This can be accomplished by delivering air from blower 25 at a constant rate independent of the rate of delivery of fuel to combustor 21. Thus, when natural gas is the fuel and sufficient air is provided for stoichiometric combustion of the maximum fuel flow (assume an air:fuel ratio of 10:1) the fuel flow may be reduced by 95% (20:1 turndown ratio) while the mass flow of products through the sparger will be reduced by approximately 9%.

The best mode known to me to carry out this invention has been described in terms sufficiently full, clear, concise, and exact as to enable any person skilled in the art to make and use the same. However, certain modifications of the above described can be made by a skilled artisan without departing from the scope of the invention which is defined only by the appended claims.

I claim:
1. The method of recarbonating a body of water comprising:
   (a) delivering a stream of carbon-bearing fuel to a combustor to meet the recarbonation demand of said body of water;
   (b) varying the rate of delivery of said fuel from a predetermined minimum at a predetermined low demand to a predetermined maximum at a predetermined high demand;
   (c) delivering a stream of air to the combustor at a constant rate independent of the rate of delivery of the fuel to the combustor, said constant rate being at least equal to the rate required for stoichiometric combustion of the fuel stream when delivered to the combustor at the predetermined maximum rate;
   (d) combustibly reacting the streams of fuel and air in the combustor to produce a substantially constant quantity of $CO_2$-containing combustion gases containing a quantity of $CO_2$ which varies in proportion to the rate of flow of the fuel stream;
   (e) immediately passing the $CO_2$-containing combustion gases downwardly through the body of water in an enclosed stream;
   (f) and releasing the $CO_2$-containing combustion gases into the body of water at a point substantially beneath the surface thereof.

2. Apparatus for recarbonating a body of water comprising:
   (a) means for delivering a stream of carbon-bearing fuel to a combustor in response to the recarbonation demand of said body of water;
   (b) means for varying the rate of delivery of said fuel from a predetermined minimum at a predetermined low demand to a predetermined maximum at a predetermined high demand;
   (c) means for delivering a stream of air to the combustor at a constant rate independent of the rate of delivery of the fuel to the combustor, said constant rate being at least equal to the rate required for stoichiometric combustion of the fuel stream when delivered to the combustor at the predetermined maximum rate;
   (d) means for combustibly reacting the streams of fuel and air in the combustor to produce a substantially constant quantity of $CO_2$-containing combustion gases containing a quantity of $CO_2$ which varies in proportion to the rate of flow of the fuel stream;
   (e) means for immediately passing the $CO_2$-containing combustion gases downwardly through the body of water in an enclosed stream;
   (f) and means for releasing the $CO_2$-containing combustion gases into the body of water at a point substantially beneath the surface thereof.

References Cited by the Examiner

UNITED STATES PATENTS

| | | | |
|---|---|---|---|
| 2,375,840 | 5/45 | Ekstrom | 126—360 |
| 3,005,288 | 10/61 | McGugin et al. | 23—150 X |
| 3,044,539 | 7/62 | Keating et al. | 158—117.5 |
| 3,048,164 | 8/62 | Walker. | |

MORRIS O. WOLK, *Primary Examiner.*